(12) United States Patent
Erlbacher et al.

(10) Patent No.: US 11,442,260 B2
(45) Date of Patent: Sep. 13, 2022

(54) IMAGING A SAMPLE IN A SAMPLE HOLDER

(71) Applicant: TECAN TRADING AG, Männedorf (CH)

(72) Inventors: Andreas Erlbacher, Grödig (AT); Markus Schürf, Bergen (DE); Josef Grassl, Schönau am Königssee (DE); Alexander Kaser, Puch bei Hallein (AT)

(73) Assignee: TECAN TRADING AG, Männedorf (CH)

( * ) Notice: Subject to any disclaimer, the term of this patent is extended or adjusted under 35 U.S.C. 154(b) by 762 days.

(21) Appl. No.: 16/041,922

(22) Filed: Jul. 23, 2018

(65) Prior Publication Data
US 2019/0049708 A1   Feb. 14, 2019

(30) Foreign Application Priority Data

Aug. 11, 2017   (EP) .................................... 17185883

(51) Int. Cl.
*G02B 21/00* (2006.01)
*G02B 7/36* (2021.01)
(Continued)

(52) U.S. Cl.
CPC ............. *G02B 21/006* (2013.01); *G02B 7/32* (2013.01); *G02B 7/36* (2013.01); *G02B 21/06* (2013.01);
(Continued)

(58) Field of Classification Search
CPC ................ G02B 21/00; G02B 21/0032; G02B 21/006; G02B 21/06; G02B 21/241;
(Continued)

(56) References Cited

U.S. PATENT DOCUMENTS 3,721,827 A   3/1973   Reinheimer
4,965,442 A   10/1990  Girod et al.
(Continued)

FOREIGN PATENT DOCUMENTS

| CN | 105230000 A   | 1/2016  |
| KR | 20010054955 A | 7/2001  |
| WO | 2015/197601   | 12/2015 |

OTHER PUBLICATIONS

Cohen, D.K. et al; "Automatic focus control: the astigmatic lens approach", Applied Optics, vol. 23, No. 4, Feb. 15, 1984.
(Continued)

*Primary Examiner* — Thong Q Nguyen
(74) *Attorney, Agent, or Firm* — Nixon & Vanderhye, P.C.

(57) ABSTRACT

A system 100 and method are provided for imaging a sample in a sample holder. For providing autofocus, a 2D pattern is projected onto the sample holder 050 via an astigmatic optical element 120. Image data 172 of the sample is acquired by an image sensor 140 via magnification optics 150. A difference in sharpness of the two-dimensional pattern in the image data is measured along a first axis and a second axis. Based on the difference, a magnitude and direction of defocus of the camera subsystem is determined with respect to the sample holder. This enables the sample holder, and thereby the sample, to be brought into focus in a fast and reliable manner.

14 Claims, 5 Drawing Sheets

(51) Int. Cl.
*G02B 7/32* (2021.01)
*G02B 21/24* (2006.01)
*G02B 21/06* (2006.01)
*G02B 21/36* (2006.01)

(52) U.S. Cl.
CPC ......... *G02B 21/244* (2013.01); *G02B 21/245* (2013.01); *G02B 21/365* (2013.01)

(58) Field of Classification Search
CPC ............... G02B 21/244; G02B 21/245; G02B 21/365; G02B 7/32; G02B 7/36; G02B 21/0016; G02B 21/0052; G02B 21/0056; G02B 21/008; G02B 21/02; G02B 7/28; G02B 7/282; G02B 7/285; G02B 7/287; G02B 7/38
USPC .................................................. 359/368–398
See application file for complete search history.

(56) References Cited

U.S. PATENT DOCUMENTS

| | | | |
|---|---|---|---|
| 5,604,344 A | | 2/1997 | Finarov |
| 6,075,558 A | * | 6/2000 | Tachibana ............ G02B 21/244 348/80 |
| 6,400,487 B1 | | 6/2002 | Harris et al. |
| 6,677,565 B1 | | 1/2004 | Wahl et al. |
| 6,974,938 B1 | | 12/2005 | Leblans et al. |
| 7,074,451 B2 | | 6/2006 | Ishikawa et al. |
| 7,805,067 B2 | * | 9/2010 | Utagawa ................. H04N 5/235 396/123 |
| 7,952,696 B2 | * | 5/2011 | Yamamoto .......... G03F 7/70641 356/124 |
| 8,120,996 B2 | | 2/2012 | Noehte et al. |
| 9,170,412 B2 | | 10/2015 | Turgeman et al. |
| 9,277,150 B2 | * | 3/2016 | Ishii ...................... H04N 5/3696 |
| 2009/0310147 A1 | * | 12/2009 | Miki ...................... G01B 11/306 356/624 |
| 2010/0316305 A1 | * | 12/2010 | Hong ...................... G06T 5/003 382/255 |
| 2012/0135511 A1 | | 5/2012 | Battrell et al. |
| 2013/0021464 A1 | * | 1/2013 | Zhang ................. G01B 11/2513 348/87 |
| 2013/0062501 A1 | | 3/2013 | Perlitz et al. |
| 2013/0100272 A1 | | 4/2013 | Price et al. |
| 2015/0002632 A1 | | 1/2015 | Kalkbrenner et al. |

OTHER PUBLICATIONS

Chinese Search Report for Chinese Application No. 2018109095166 dated Oct. 13, 2020.

* cited by examiner

310

320

IMAGING A SAMPLE IN A SAMPLE HOLDER

This application claims priority to EP Patent Application No. 17185883.0 filed 11 Aug. 2017, the entire contents of which is hereby incorporated by reference.

FIELD OF THE INVENTION

The invention relates to an imaging system and method for imaging a sample in a sample holder. The invention further relates to a computer program comprising instructions for causing a processor system to perform the method.

BACKGROUND ART

Digital microscopes and similar devices such as microplate readers are typically equipped with image sensors acquire image data of samples. To obtain such image data with sufficient sharpness, such imaging systems may be provided with autofocus functionality to be able to focus onto the sample holder, e.g., onto its bottom part, its upper part and/or onto an intermediate position within the sample holder.

Various types of autofocus are known, which are commonly categorized as 'active' or 'passive'. Here, 'active' autofocus typically involves the use of dedicated hardware, such as dedicated light sources and detectors, whereas 'passive' autofocus typically makes use of the acquired image data, and thereby uses the existing imaging hardware, to determine whether the sample is in-focus. An advantage of passive autofocus is generally its lower cost as no dedicated hardware may be need. However, a distinct disadvantage is its generally lower autofocus speed, as passive autofocus is normally is based on acquiring several images at different focal planes. Active autofocus may determine the correct focus from a single focus measurement.

WO2015197601 combines active and passive autofocus. A dedicated autofocus light device is described, which projects a reference pattern via an autofocus illumination beam path through the microscope objective and towards the sample. Light backscattered from a reference surface within or near the sample passes back through the microscope objective, and is directed via an autofocus detection beam path towards the autofocus detector, where it forms an autofocus detection pattern. The referenced surface is defined by one of the interfaces located at or close to the sample.

The autofocus illumination and detection beam path are designed such that, depending on the location of the reference surface, the chosen interface along the optical axis and relative to the microscope objective, the autofocus detection pattern changes its size, its position and/or its shape. It is said that various approaches to obtain this position information, also called height encoding, are known in the art. For example, the reference pattern in the sample plane can be a single spot, resulting in an autofocus detection pattern which is also a spot, but changes its size (due to blurred, unfocused imaging), its shape (due to astigmatic, laterally distorted imaging) or its lateral position (due to the autofocus illumination and/or detection beam path being tilted relative to the microscope's optical axis) when the axial distance between the reference surface and the microscope objective is varied.

Disadvantageously, the robustness of WO2015197601 may be insufficient, for example, in case of scratches or dust on a surface of the sample or sample holder.

SUMMARY OF THE INVENTION

It would be advantageous to obtain more robust autofocus in an imaging system which is configured for imaging a sample in a sample holder.

In accordance with a first aspect of the invention, imaging system is provided for imaging a sample in a sample holder. The imaging system comprises:
  a camera subsystem comprising an image sensor and magnification optics and configured to image the sample via the magnification optics;
  a projection subsystem comprising a light source and an astigmatic optical element and configured to project a two-dimensional pattern onto the sample holder via the astigmatic optical element and the magnification optics;
  a processor subsystem comprising:
    a camera interface configured to receive image data acquired by the camera subsystem;
    a memory comprising instruction data representing a set of instructions; and
    a processor configured to communicate with the camera interface and the memory and to execute the set of instructions, wherein the set of instructions, when executed by the processor, cause the processor to:
    analyse the image data to identify the two-dimensional pattern;
    determine a measure of sharpness of the two-dimensional pattern along a first axis in the image data;
    determine a measure of sharpness of the two-dimensional pattern along a second axis in the image data which is orthogonal to the first axis; and
    determine a difference between the measures of sharpness along the first axis and the second axis, and based on the difference, determine a magnitude and direction of defocus of the camera subsystem with respect to the sample holder.

In accordance with another aspect of the invention, a computer-implemented method is provided of imaging a sample in a sample holder, wherein a two-dimensional pattern is projected by a light source onto the sample holder via an astigmatic optical element, the method comprising:
  obtaining image data of the sample which is acquired by an image sensor via magnification optics;
  analysing the image data to identify the two-dimensional pattern;
  determining a measure of sharpness of the two-dimensional pattern along a first axis in the image data;
  determining a measure of sharpness of the two-dimensional pattern along a second axis in the image data which is orthogonal to the first axis; and
  determining a difference between the measures of sharpness along the first axis and the second axis, determine a magnitude and direction of defocus of the camera subsystem with respect to the sample holder.

In accordance with another aspect of the invention, a transitory or non-transitory computer-readable medium is provided comprising a computer program which comprises instructions for causing a processor system to perform the method.

In general, a system and method may be provided for imaging a sample in a sample holder. For providing fast and reliable autofocus, a 2D pattern may be projected onto the sample holder via an astigmatic optical element. Image data of the sample may be acquired by an image sensor via magnification optics. A difference in sharpness of the two-dimensional pattern in the image data may be measured along a first axis and a second axis. Based on the difference, a magnitude and direction of defocus of the camera subsystem may be determined with respect to the sample holder. This enables the sample holder, and thereby the sample, to be brought into focus in a fast and reliable manner.

It will be appreciated by those skilled in the art that two or more of the above-mentioned embodiments, implementations, and/or aspects of the invention may be combined in any way deemed useful.

Modifications and variations of the method and/or the computer program, which correspond to the described modifications and variations of the imaging system, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
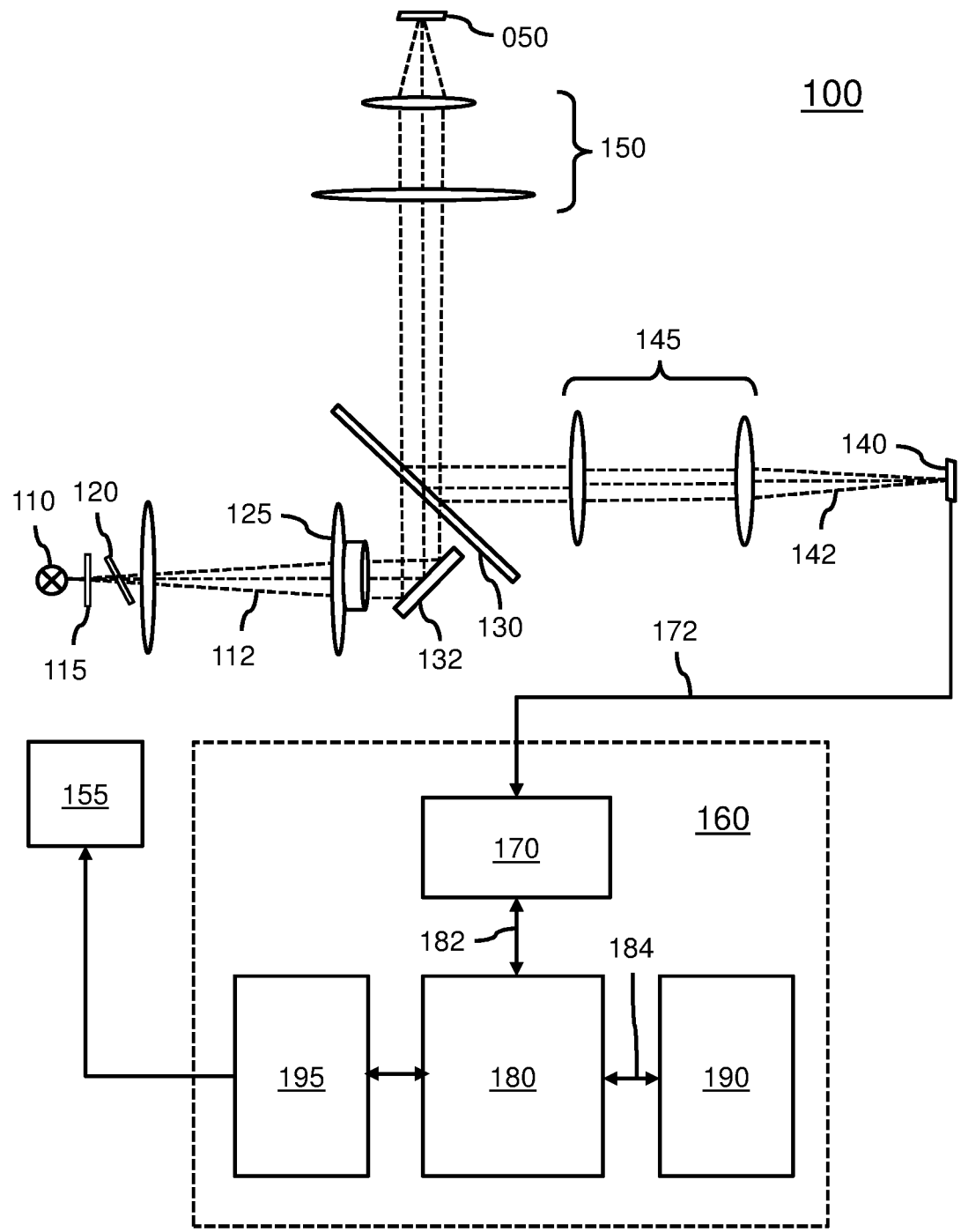
FIG. 1 shows an imaging system for imaging a sample in a sample holder, with the imaging system being arranged for determining a defocus with respect to the sample holder by projecting an 2D pattern onto the sample holder via an astigmatic optical element, and comparing the sharpness of the image data in two orthogonal spatial directions.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.
050 sample holder
100 imaging system
110 light source
112 emitted light
115 grid plate
120 astigmatic optical element
125 achromat
130, 132 mirror
140 image sensor
142 reflected light
145 tube lens
150 magnification optics
155 actuator
160 processor subsystem
170 camera interface
172 image data
180 processor
182, 184 data communication
190 memory
195 actuator interface
200 two-dimensional pattern
202 horizontal grid line
204 vertical grid line
300 imaged pattern at first z-position
302 first z-position
310 imaged pattern at second z-position
312 second z-position
320 imaged pattern at intermediate z-position
322 intermediate z-position
400 z-position in μm
402 sharpness measure according to Sobel operator
410 measured sharpness for well, 2× magnification
412 sharpness in horizontal direction
414 sharpness in vertical direction
420 measured sharpness for well, 4× magnification
422 sharpness in horizontal direction
424 sharpness in vertical direction
430 peaks of reflection by bottom surface of well bottom
440 peaks of reflection by upper surface of well bottom
500 method of imaging sample in sample holder
510 obtaining image data of sample
520 determining measure of sharpness along first axis
530 determining measure of sharpness along second axis
540 determining magnitude and direction of defocus
600 computer readable medium
610 non-transitory data

DETAILED DESCRIPTION OF EMBODIMENTS

The example aspects of the invention involve imaging a sample in a sample holder, such as a well of a microplate or a slide. For that purpose, a camera subsystem is provided, which comprises an image sensor such as a CCD or CMOS sensor and magnification optics such as one or more lenses. Furthermore, a processor subsystem is provided, which may be embodied by, e.g., a computer or the like, and which comprises a camera interface to the camera subsystem, a memory and a processor.

Additionally, a projection subsystem is provided having a light source such as a light-emitting diode and an astigmatic optical element such as a tilted glass plate or a cylindrical lens. The projection subsystem is configured to project a two-dimensional (2D) pattern onto the sample holder via the astigmatic optical element and via the magnification optics of the camera subsystem. Here, the term 'two-dimensional' refers to the pattern extending in two dimensions, and thereby having spatial detail in both dimensions. When projected onto the sample holder, the pattern is visible in the image data acquired by the camera subsystem.

The (de)focus of the camera subsystem with respect to the sample holder, and thereby the sample, is then determined as follows. An image is acquired when the 2D pattern is projected onto the sample holder. An amount of sharpness of the two-dimensional pattern is determined along a first axis in the image data, and an amount of sharpness of the two-dimensional pattern is determined along a second axis in the image data which is orthogonal to the first axis. Both axis may be selected to be rotationally aligned with the tangential and sagittal planes of the astigmatic optical element, which may frequently correspond to the vertical axis and horizontal axis of the image data. The difference between both measured amounts of sharpness is then determined, which is then used to determine the amount and direction of the defocus of the camera subsystem with respect to the sample holder. The sample holder, and thereby the sample may then be brought into focus of the camera subsystem.

A more detailed explanation may be the following. By projecting the 2D pattern via the astigmatic optical element, the light rays that propagate in the tangential and sagittal planes of the astigmatic optical element may have different focal distances. By way of example, it is in the following assumed that these planes are aligned with the horizontal and vertical axis of the 2D pattern shown in the image data. Accordingly, horizontal spatial information of the 2D pattern may be projected onto a first focal plane, whereas vertical spatial information may be projected onto a second focal plane. The inventors have devised to use this difference in focal distance to obtain a fast yet reliable autofocus. Namely, if there is a reflective surface in the focal plane, e.g., from a surface of the sample holder, the light representing the projected 2D pattern will be reflected back through the magnification optics, with the reflected 2D pattern then being imaged on the surface of the image sensor. If one were to gradually increase or decrease the relative position between sample holder and magnification optics while acquiring image data, firstly horizontal (or vertical) spatial detail of the 2D pattern will appear sharp in the image data, then horizontal and vertical spatial detail will appear equally sharp in the image data, and then vertical (or horizontal) spatial detail will appear sharp. In any other position than the intermediate position, spatial detail of the 2D pattern will be blurred differently for the horizontal and vertical spatial detail depending on the relative position of the current focus to the different focal distances of the 2D pattern established by the astigmatism. By comparing the sharpness along both image axis, the magnitude and direction of defocus can be determined.

Namely, the focal plane of the camera subsystem may have a known relation to any of the above-described positions of the sample holder. For example, by means of suitable mechanical and/or optical design, the focal plane of the camera subsystem may coincide with the 'intermediate position' of the sample holder in which horizontal and vertical spatial detail of the projected 2D pattern appears equally sharp. Alternatively, the focal plane of the camera subsystem may, by means of said mechanical and/or optical design, coincide with any of the two focal planes of the projection subsystem. There may also be a known offset between the focal plane of the camera subsystem and the focal plane(s) of the projection subsystem, e.g., as may be determined by calibration during manufacture and stored as data in a memory. On this basis, the sample holder, and thereby the sample, may be brought into focus.

Although autofocus on the basis of astigmatism is known per se, such known autofocus is typically based on the changes in shape of a laser-projected dot. The inventors have determined that such changes in shape cannot be determined sufficiently reliably from the image data of an image sensor, particularly in case of there being scratches or dust on a surface of the sample or sample holder. However, horizontal and vertical sharpness may be measured reliably, in particular if a pattern is used which is sizable in the image data and has sufficient image detail in either direction. Accordingly, a more reliable autofocus is obtained than autofocus based on a laser-projected dot, while being faster than entirely passive autofocus.

Optionally, the set of instructions, when executed by the processor, cause the processor to determine each measure of sharpness on the basis of a spatial filtering operation applied to the image data, or a frequency transform of the image data. The amount of spatial detail in a particular direction may be quantified in the spatial domain by using suitable spatial filters. A non-limiting example are edge detection filters such as filters based on the Sobel kernel. Alternatively, the spatial detail may be quantified in the frequency domain, e.g., using a 2D Fourier transform.

Optionally, the projection subsystem further comprises an optical element such as an achromat configured to collimate light emitted by the light source after passing through the astigmatic optical element. For example, the achromat may be a compound lens system that forms an image free from chromatic aberration.

Optionally, the projection subsystem is configured to project the two-dimensional pattern onto the sample holder via the magnification optics, and the camera subsystem is configured to image the sample via the magnification optics. The magnification optics which are used by the camera subsystem may thus be (re-)used by the projection subsystem to project the 2D pattern onto the sample holder.

Optionally, the imaging system comprises a mirror configured to, with one side, reflect at least part of the light which is reflected by the sample and which has passed through the magnification optics onto the image sensor, and with the other side, transmit at least part of the light which is emitted by the light source towards the magnification optics. Such a mirror allows the light emitted by the projection subsystem to be redirected towards the magnification optics while redirecting the light reflected by the sample and/or sample holder towards the camera subsystem.

Optionally, the two-dimensional pattern is a two-dimensional grid. For example, the grid may have a number of horizontal grid lines and a number of vertical grid lines. Each number may be the range of, e.g., 5 to 15 grid lines, or 10 to 20 grid lines, or in general have any other suitable value. The spacing of the grid lines may be a regular spacing, e.g., 50 µm at a width of 5 µm. In some embodiments, the measures of sharpness may only be applied to a part of the two-dimensional grid, e.g., a region of interest. For example, the region of interest may comprise 11×11 grid lines.

Optionally, the two-dimensional pattern is provided by a plate which is arranged between the light source and the astigmatic optical element. For example, in case the pattern is a grid, the plate may be a net grid plate, e.g., constituted by a grid (net) of wires or beams, or a transparent plate onto which the pattern is painted, etc. Alternatively, the two-dimensional pattern may be established by any known projection technique. For example, a transmissive or reflective microdisplay may be used.

Optionally, the imaging system further comprises:
an actuator configured to adjust a distance between the sample holder and the magnification optics; and
in the processor subsystem, an actuator interface configured to control the actuator,
wherein the set of instructions, when executed by the processor, cause the processor to, based on the magnitude and direction of defocus, control the actuator via the actuator interface to bring the sample and/or sample holder into focus.

It will be appreciated that the distance between the sample holder and the magnification optics may be adjusted in various ways using an actuator, e.g., by using the actuator to move the sample holder, the magnification optics, or a combination of both. As such, any reference to 'bringing the sample and/or sample holder into focus' is to be understood, unless otherwise noted, as including any of these options.

FIG. 1 shows an example of an imaging system 100 for imaging a sample in a sample holder 050, such as a well of a microplate or a transparent microscopy slide or a biochip such as a biochip configured for cell counting. The sample which may be imaged may be a biological sample, but is not limited to thereto.

The imaging system 100 comprises a camera subsystem which comprises an image sensor 140 and magnification optics 150, with the camera subsystem being configured to image the sample in the sample holder 050 using the magnification optics 150. The image sensor 140 may be of any suitable type for imaging samples in a sample holder 050. For example, the image sensor 140 may be a CMOS or CCD-type sensor and may be integrated into a camera module. The magnification optics 150 may be selected to provide a particular magnification level, such as, but not limited to 2×, 4× and 10× magnification, or a range of such levels. In a specific example, the camera may be a CMOS camera having a 5 megapixel resolution and ⅔" sensor size, the magnification optics may comprise a 2× magnification objective, e.g., with an numerical aperture (NA) of 0.08, a working distance of 6.20 mm, a Field of View of 13.25 mm and an XY resolution of 4.19 μm. Further shown are optical elements 145 which, in this example, comprise a tube lens having a magnification 0.5× and which may be arranged for matching the optical resolution approximately to the pixel size of the camera.

The imaging system 100 further comprises a projection subsystem which comprises a light source 110, such as a light-emitting diode (LED) or an arrangement of LEDs, and an astigmatic optical element 120, such as a tilted glass plate or a cylindrical lens. FIG. 1 shows a tilted glass plate 120, e.g., having a thickness d of 1 mm and a tilting angle α of 30°. The projection subsystem is configured to project, by means of light emitted by the light source 110, a two-dimensional pattern onto the sample holder 050 via the astigmatic optical element 120. For that purpose, different projection techniques may be used. In the example of FIG. 1, the two-dimensional pattern is provided on a plate 115 which is arranged between the light source 110 and the astigmatic optical element 120. For example, the plate 115 may be a net grid plate which establishes a two-dimensional pattern in the form of a grid by means of a grid of wires or beams, e.g., a 'net'-like structure. The plate 115 may also be a transparent plate on which the pattern is painted or in another manner established in a light-absorbing manner. In yet another example, the plate 115 may be non-transparent but having the pattern carved out of the material of the plate 115 so as to locally pass through light forming the pattern. In yet another example, instead of a plate 115, a transmissive or reflective microdisplay may be used to project the pattern.

FIG. 1 further shows the light 112 emitted by the light source 110, after passing through the astigmatic optical element 120, passing through an achromat 125 which is configured to collimate the light 112, and subsequently being redirected by mirrors 130, 132 towards the magnification optics 150. It is noted that instead of the achromat 125, other types of lenses may be used, such as aspheric lenses, etc.

The imaging system 100 is further shown to comprise a processor subsystem 160, which comprises a camera interface 170, a memory 190 and a processor 180, with the processor 180 communicating with the camera interface 170 via data communication 182 and with the memory 190 via data communication 184. The camera interface 170 may be configured to receive image data 172 acquired by the image sensor 140. In some embodiments, the camera interface 170 may be also configured to provide control data to the image sensor 140 and/or the camera subsystem to enable the processor 180 to control the camera subsystem.

The memory 190 may comprise instruction data representing a set of instructions, which when executed by the processor 180 during operation of the imaging system 100, cause the processor 180 to determine a measure of sharpness of the two-dimensional pattern along a first axis in the image data 172, determine a measure of sharpness of the two-dimensional pattern along a second axis in the image data 172 which is orthogonal to the first axis, and determine a difference between the measures of sharpness along the first axis and the second axis, and based on the difference, determine a magnitude and direction of defocus of the camera subsystem with respect to the sample holder. This operation of the processor 180, including optional aspects thereof, will be further explained with reference to FIGS. 2-4B.

Although only schematically shown in FIG. 1, the imaging system 100 may further comprise an actuator 155, such as an electric motor, which may be configured to adjust a distance between the sample holder 050 and the magnification optics 150. For example, the actuator may be configured to move the sample holder 050, the magnification optics 150, or both. Moreover, in the processor subsystem 160, an actuator interface 195 may be provided which may be configured to enable the processor 180 to control the actuator. Accordingly, the processor 180 may, on the basis of the magnitude and direction of defocus, control the actuator via the actuator interface to bring the sample and/or sample holder 050 into focus. For example, the sample holder may be positionable by the actuator in Z-direction, referring to a direction parallel to the optical path of the camera subsystem between the magnification optics and the sample holder. Accordingly, the sample holder 050 may be brought into a Z-position at which the sample and/or the sample holder 050 is in-focus of the camera subsystem.

In general, the camera interface 170 may take any suitable form, including but not limited to USB, FireWire, Wi-Fi, and similar types of wired and wireless data communication interfaces. It is noted that the camera interface 170 may comprise or consist of multiple interfaces, e.g., arranged in parallel and/or series. For example, the camera interface 170 may comprise a HDMI interface for receiving the image data from the camera, and an I2O interface for controlling the camera. Although not shown in FIG. 1, the camera subsystem may comprise a corresponding type of interface.

In some embodiments, the processor subsystem 160 may be implemented as a device, apparatus or system separate from the camera subsystem and the projection subsystem. For example, the processor subsystem 160 may be embodied by a workstation, a server, a personal computer, etc., which may be connected to the camera subsystem via the camera interface 170. In a specific embodiment, the camera subsystem may be part of a microplate reader, which may further include the projection subsystem and a microplate transport (not shown in FIG. 1) and which may be connected to the device, apparatus or system embodying the processor subsystem 160 via one or more data communication interfaces, including but not limited to the camera interface 170. Alternatively, the camera subsystem, the projection subsystem and the processor subsystem 160 may be part of a same device, apparatus or system, e.g., a microplate reader having one or more embedded processors configured for performing the operations described with reference to the processor 180.

In general, the processor subsystem 160 may be embodied as—or in—a device, apparatus or system. The device, apparatus system may comprise one or more processors, such as microprocessors, which execute appropriate software. Software implementing the described operations of processor 180 may have been downloaded and/or stored in a corresponding memory 190 or memories, e.g., in volatile memory such as RAM or in non-volatile memory such as Flash. Alternatively, the processor 180 may be implemented in the device, apparatus or system in the form of programmable logic, e.g., as a Field-Programmable Gate Array (FPGA). The camera interface and the optional actuator interface may each be implemented by respective interfaces of the device, apparatus or system. In general, each unit of the processor subsystem may be implemented in the form of a circuit and/or in a distributed manner, e.g., involving different devices or apparatuses. For example, the distribution may be in accordance with a client-server model, e.g., using a server and a client workstation.

Figure 2:
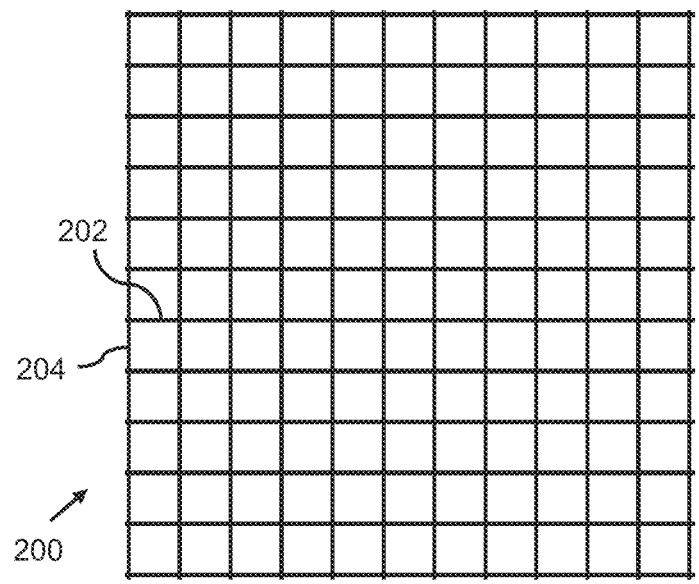
FIG. 2 shows an example of a 2D pattern in the form of a grid.

FIG. 2 shows an example of a two-dimensional pattern in the form of a grid 200. The grid 200 may have a number of horizontal grid lines 202 and a number of vertical grid lines 204, which may be, but do not need to be, regularly spaced. In the example of FIG. 2, the grid 200 is a 12×12 grid, but in general, the number of grid lines along each axis may vary, e.g., between 5 and 15 or between 20 and 30. Various other types of 2D patterns are equally conceived. Preferably, such 2D pattern contains an equal or similar amount of detail in the horizontal and vertical direction (or in general, along the two axis along which astigmatism is established), where the amount of detail may be measured in a same manner as during use of the imaging system. For example, the 2D pattern may comprise circular, rectangular or triangular shapes.

Figure 3A:
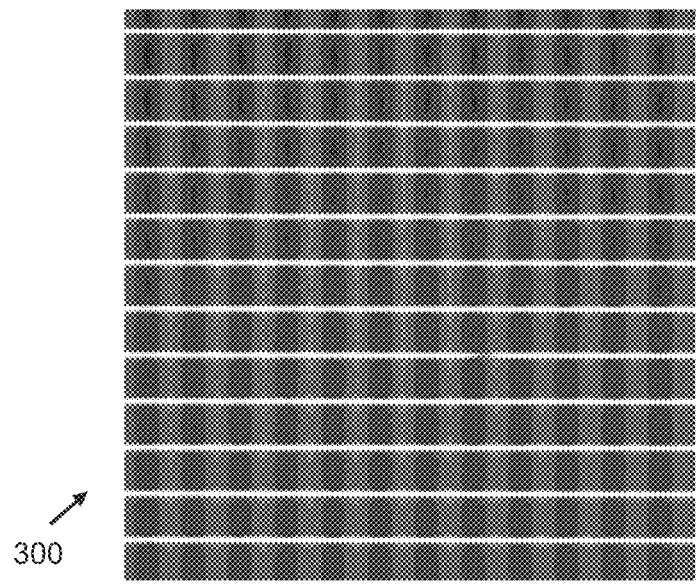
FIG. 3A shows an imaged version of the grid which is acquired at a first Z-position at which the vertical grid lines are shown at maximum sharpness.
Figure 3B:
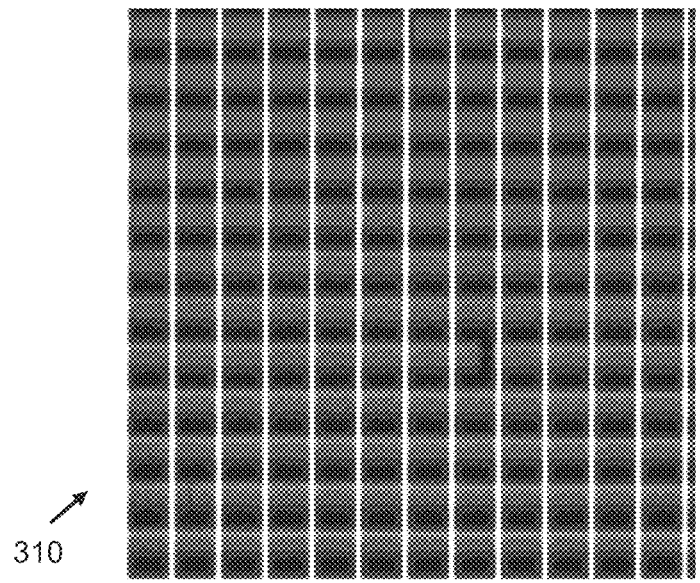
FIG. 3B shows an imaged version of the grid which is acquired at a second Z-position at which the horizontal grid lines are shown at maximum sharpness.
Figure 3C:
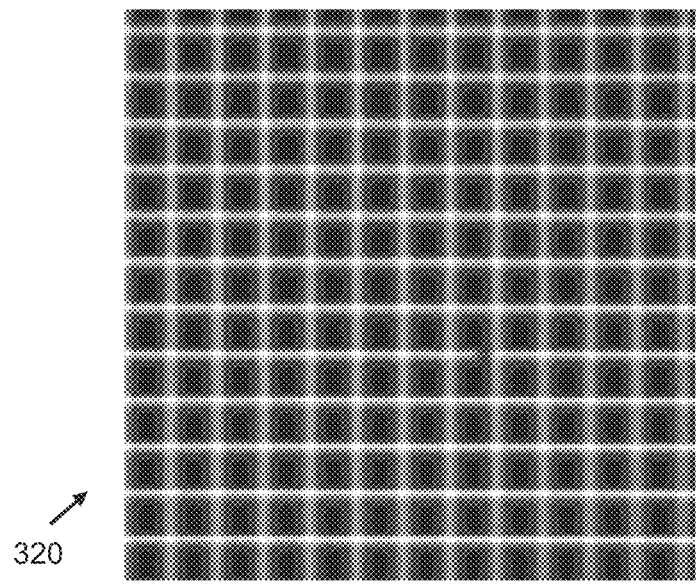
FIG. 3C shows an imaged version of the grid which is acquired at an intermediate Z-position between the first Z-position and the second Z-position at which the vertical grid lines and the horizontal grid lines are shown at a similar sharpness.

FIG. 3A shows an imaged version 300 of a grid, e.g., as may be shown in the image data, which is, for illustrative purposes, acquired at a first Z-position of the sample holder at which the horizontal grid lines are shown at maximum sharpness. At this Z-position, the horizontal grid lines are in-focus of the camera subsystem, whereas the vertical grid lines are out-of-focus and thus appear blurred in the image data. It is noted that the grid of FIG. 3A is inverted with respect to the grid of FIG. 2, which may be due to the grid being projected by transmission of light at the grid lines rather than by absorption. FIG. 3B shows an imaged version 310 of the grid which is acquired at a second Z-position at which the vertical grid lines are shown at maximum sharpness. At this Z-position, the vertical grid lines are in-focus of the camera subsystem, whereas the horizontal grid lines are out-of-focus and thus appear blurred in the image data. FIG. 3C shows an imaged version 320 of the grid which is acquired at an intermediate Z-position between the first Z-position and the second Z-position at which the horizontal grid lines and the vertical grid lines are shown at a similar sharpness. This Z-position corresponds to the Z-position at which the reflective surface, which reflected the light representing the grid back towards the camera subsystem, is in-focus.

Figure 4A:
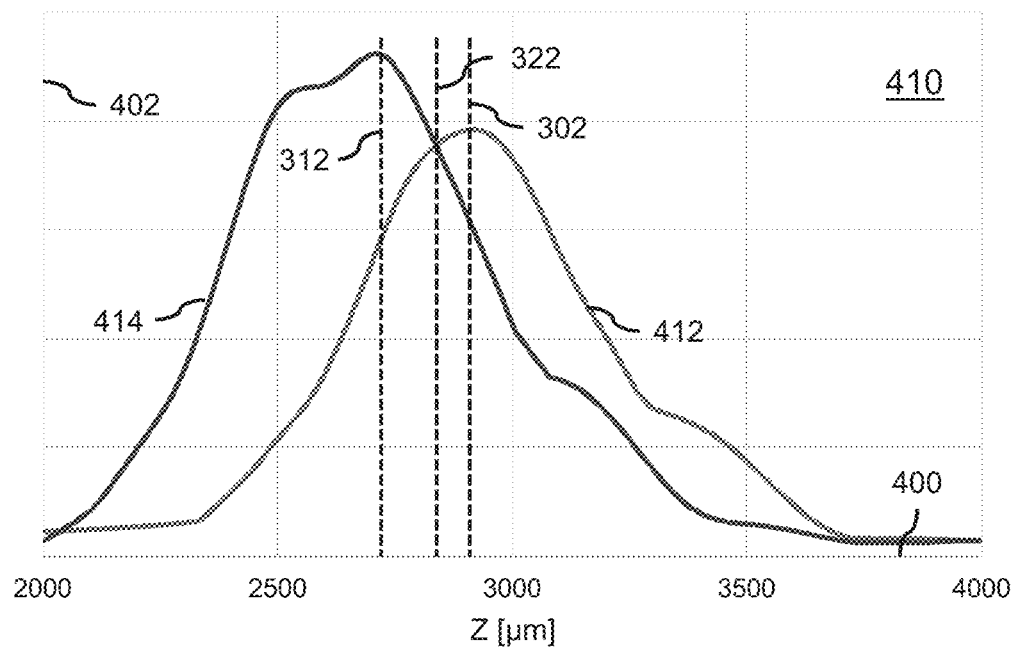
FIG. 4A shows a measure of sharpness as a function of the Z-position for both the horizontal and vertical sharpness for a well at 2× magnification.

FIG. 4A shows a measurement graph 410 showing a measure of sharpness 402 as a function of the Z-position 400 in μm, yielding a measurement curve 412 of sharpness in horizontal direction and a measurement curve 414 of sharpness in vertical direction. Here, the Z-position in μm is the relative distance between the camera subsystem and the sample holder 050 and representative of the focal distance of the camera subsystem.

In this example, it can be seen that at approximately 2900 μm, the horizontal grid lines of the grid are imaged at maximum sharpness, while at approximately 2750 μm, the vertical grid lines of the grid are imaged at maximum sharpness. Finally, at an intermediate position in between, e.g., at approximately 2850 μm, both horizontal and vertical grid lines appear equally sharp in the image data. These three Z-positions conceptually correspond to the first Z-position 302, the second Z-position 312 and the intermediate Z-position 322, respectively, which were described with reference to FIGS. 3A-3C and are indicated in FIG. 4A by dashed lines.

It can be seen from FIG. 4A that a measurement of sharpness in both horizontal and vertical direction corresponds to a cross-section of the two measurement curves 412, 414, and that having (approximate) knowledge of the curves allows the optimal focus position, e.g., the intermediate Z-position 322, to be determined by the respective values of the sharpness in both directions. However, such knowledge of the curves may be substituted by a linear or first-order approximation. For example, in a slightly different example than that of FIG. 4A, where the amount of sharpness is defined by a standard deviation of the grid lines in both vertical ($SD_{ver}$) and horizontal ($SD_{hor}$) direction, a focus function may be defined as: $F=(SD_{hor}^2-SD_{ver}^2)/(SD_{hor}^2+SD_{ver}^2)$. Here, the sign of F may indicate the direction, whereas the absolute value of F may be proportional to the distance towards the optima; focus distance. A new position may be calculated as $Z_{new}=Z_{old}+k*F$, with k being a system-dependent factor.

Various other measures of sharpness may conceived. For example, the maximum intensity may be a measure of sharpness in that grid lines which are in-focus yield a narrower peak with a higher maximum intensity (for black lines on a bright background) while out-of-focus grid lines yield a wider peak with a lower maximum intensity. The maximum intensity may thus be used as a measure of sharpness. In other examples, the measure of sharpness may be calculated in the frequency domain, e.g., as obtained by Fast Fourier transform (FFT) or any other suitable transform.

It is noted that it is not needed to precisely calculate the amount and direction of defocus (and thereby the optimal focus position). Rather, some inaccuracy may be acceptable depending on the use-case. Furthermore, the autofocus measurement may be applied iteratively so as to converge to the optimal focus position over two or more measurements, e.g., until the focus error is below a predefined limit. During use, if focus is 'lost', e.g., due to temperature effects, a single measurement may suffice to bring the sample holder and/or the sample back into focus.

Figure 4B:
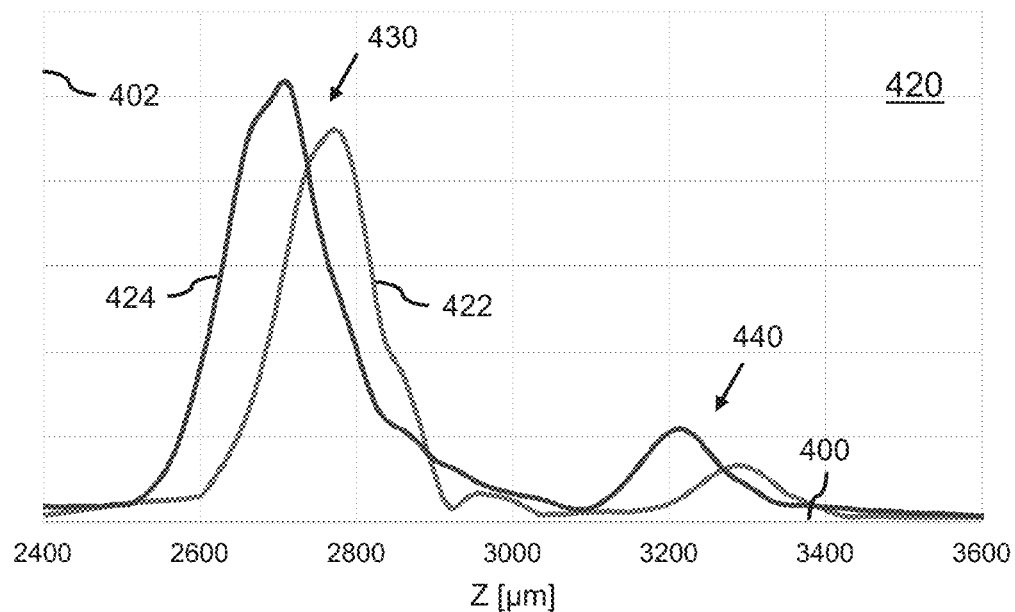
FIG. 4B shows a measure of sharpness as a function of the Z-position for both the horizontal and vertical sharpness for a well at 4× magnification.

The measurement graph 410 of FIG. 4A relates to a well which is imaged with 2× magnification. FIG. 4B shows a measurement graph 420 which is similar to that of FIG. 4A, in that it shows a measurement curve 422 of sharpness in horizontal direction and a measurement curve 424 of sharpness in vertical direction, but now for a well at 4× magnification. It can be seen that optimal focus is achieved at a slightly different Z-position. Furthermore, FIG. 4B illustrates that the imaged pattern may be a superposition of multiple reflections, e.g., from different surfaces of the sample holder. For example, in case the sample holder is a well containing a liquid, the imaged pattern may be a superposition of reflections at the upper surface of the well bottom, e.g., at the interface of the liquid and the well bottom, and the bottom surface of the well bottom, e.g., between the well bottom and surrounding air. Both reflections provide non-coinciding peaks, of which one reflection provides the 'main' peaks 430 and the other reflection is visible as secondary peaks 440 at 3200 and 3300 μm. In this example, the main peaks 430 are from reflection by the bottom surface of the well bottom, as here the difference in refraction index is largest, whereas the secondary peaks 440 are from reflection by the upper surface of the well bottom. If it is desired to focus on the upper surface, an offset may be applied to the determined focus position, or both sets of peaks 430, 440 may be detected in the measurement graph. The offset may be a predetermined offset, e.g., obtained by calibration, e.g., during manufacture.

In general, the optimal focus position may pertain to one of the surfaces of the sample holder. If another focus position is desired which has a known relative position to this surface, e.g., another surface of the sample holder or a position within the sample, an offset may be applied to the determined focus position.

Although FIGS. 4A and 4B relate to 2× and 4× magnification, experiments have demonstrated feasibility also for other magnification factors, e.g., 10×.

In general, the invention as claimed may be used for bright field imaging applications with sample containers such as microplates, slides, chips, etc. In addition, the invention as claimed may be applied in fluorescence imaging applications.

Figure 5:
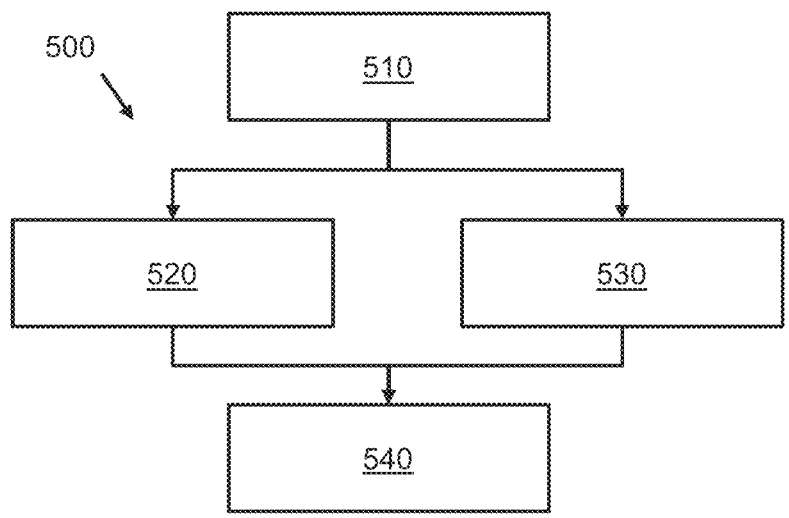
FIG. 5 shows a method of imaging a sample in a sample holder.

FIG. 5 shows a computer-implemented method 500 for imaging a sample in a sample holder. The method 500 comprises, in an operation titled "OBTAINING IMAGE DATA OF SAMPLE", obtaining 510 image data of the sample which is acquired by an image sensor via magnification optics. The method 500 further comprises, in an operation titled "DETERMINING MEASURE OF SHARPNESS ALONG FIRST AXIS", determining 520 a measure of sharpness of the two-dimensional pattern along a first axis in the image data. The method 500 further comprises, in an operation titled "DETERMINING MEASURE OF SHARPNESS ALONG SECOND AXIS", determining 530 a measure of sharpness of the two-dimensional pattern along a second axis in the image data which is orthogonal to the first axis. The method 500 further comprises, in an operation titled "DETERMINING MAGNITUDE AND DIRECTION OF DEFOCUS", determining 540 a difference between the measures of sharpness along the first axis and the second axis, and based on the difference, determine a magnitude and direction of defocus of the camera subsystem with respect to the sample holder.

The method 500 may be performed with an imaging system as described in this specification, but may also be of a different type provided that it comprises means for projecting a two-dimensional pattern onto the sample holder via an astigmatic optical element. If such projection is performed on the basis of projection data defining the pattern, e.g., in case the projection is performed using a microdisplay, the method may further comprise, as an initial operation, generating projection data for projecting the two-dimensional pattern onto the sample holder via the astigmatic optical element. Alternatively, if the light source is computer-controlled, the method may comprise, as an initial operation, controlling the light source for causing the two-dimensional pattern to be projected onto the sample holder via the astigmatic optical element.

Figure 6:
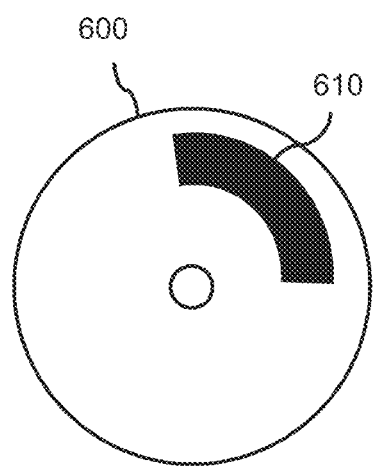
FIG. 6 shows a computer readable medium comprising non-transitory data, with said data representing a computer program for performing the method.

The method 500 may be implemented on a processor system, e.g., on a computer as a computer implemented method, as dedicated hardware, or as a combination of both. As also illustrated in FIG. 6, instructions for the computer, e.g., executable code, may be stored on a computer readable medium 600, e.g., in the form of a series 610 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 6 shows an optical disc 600.

Examples, embodiments or optional features, whether indicated as non-limiting or not, are not to be understood as limiting the invention as claimed.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An imaging system for imaging a sample in a sample holder, the imaging system comprising:
   a camera subsystem comprising an image sensor and magnification optics and configured to image the sample via the magnification optics;
   a projection subsystem comprising a light source and an astigmatic optical element and configured to project a two-dimensional pattern onto the sample holder via the astigmatic optical element and the magnification optics;
   an actuator configured to adjust a distance between the sample holder and the magnification optics; and
   a processor subsystem comprising:
      a camera interface configured to receive image data acquired by the camera subsystem;
      an actuator interface configured to control the actuator;
      a memory comprising instruction data representing a set of instructions; and
      a processor configured to communicate with the camera interface and the memory and to execute the set of instructions, wherein execution of the set of instructions by the processor causes the processor to:
         determine a measure of sharpness of the two-dimensional pattern along a first axis in the image data;
         determine a measure of sharpness of the two-dimensional pattern along a second axis in the image data which is orthogonal to the first axis;

determine a difference between the measures of sharpness along the first axis and the second axis, and based on the difference, determine a magnitude and direction of defocus of the camera subsystem with respect to the sample holder; and based on the magnitude and/or direction of defocus, control the actuator via the actuator interface to adjust the distance between the sample holder and the magnification optics.

2. The imaging system according to claim 1, wherein execution of the set of instructions by the processor causes the processor to determine each measure of sharpness on the basis of a spatial filtering operation applied to the image data, or a frequency transform of the image data.

3. The imaging system according to claim 1, wherein the astigmatic optical element is a tilted glass plate or a cylindrical lens.

4. The imaging system according to claim 1, wherein the projection subsystem further comprises an optical element configured to collimate light emitted by the light source after passing through the astigmatic optical element.

5. The imaging system according to claim 1, further comprising a mirror configured to, with one side, reflect at least part of light which is reflected by the sample and which has passed through the magnification optics onto the image sensor, and with the other side, transmit at least part of the light which is emitted by the light source towards the magnification optics.

6. The imaging system according to claim 1, wherein the two-dimensional pattern is a two-dimensional grid.

7. The imaging system according to claim 6, wherein the two-dimensional grid has a number of horizontal grid lines and a number of vertical grid lines each in the range of 5 to 15 grid lines.

8. The imaging system according to claim 1, wherein the two-dimensional pattern is provided by a plate which is arranged between the light source and the astigmatic optical element.

9. The imaging system according to claim 1, wherein execution of the set of instructions by the processes, causes the processor to, based on the magnitude and direction of defocus, control the actuator via the actuator interface to bring the sample or the sample holder into focus.

10. The imaging system according to claim 1, wherein the light source is a light emitting diode.

11. The imaging system according to claim 1, wherein the imaging system is a microplate reader.

12. The imaging system according to claim 1, wherein the sample holder is a well of a microplate or a slide.

13. A non-transitory computer-readable medium comprising a computer program, the computer program comprising instructions for causing a processor subsystem of the imaging system of claim 1 to perform a method comprising:

receiving image data acquired by the camera subsystem;

determining a measure of sharpness of the two-dimensional pattern along a first axis in the image data;

determining a measure of sharpness of the two-dimensional pattern along a second axis in the image data which is orthogonal to the first axis;

determining a difference between the measures of sharpness along the first axis and the second axis, and based on the difference, determine a magnitude and direction of defocus of the camera subsystem with respect to the sample holder; and based on the magnitude and/or direction of defocus, controlling the actuator to adjust the distance between the sample holder and the magnification optics.

14. A computer-implemented method of imaging a sample in a sample holder using an imaging system, the imaging system comprising:

a camera subsystem comprising an image sensor and magnification optics and configured to image the sample via the magnification optics;

a projection subsystem comprising a light source and an astigmatic optical element and configured to project a two-dimensional pattern onto the sample holder via the astigmatic optical element and the magnification optics;

an actuator configured to adjust a distance between the sample holder and the magnification optics;

the method, performed by a processor of the imaging system, comprising:

receiving image data acquired by the camera subsystem;

determining a measure of sharpness of the two-dimensional pattern along a first axis in the image data;

determining a measure of sharpness of the two-dimensional pattern along a second axis in the image data which is orthogonal to the first axis;

determining a difference between the measures of sharpness along the first axis and the second axis, and based on the difference, determine a magnitude and direction of defocus of the camera subsystem with respect to the sample holder; and based on the magnitude and/or direction of defocus, controlling the actuator to adjust the distance between the sample holder and the magnification optics.

* * * * *